July 16, 1963  D. E. WILLIS  3,097,680
VEHICLE TIRE AND MOUNTING MEANS THEREFOR
Filed Aug. 16, 1961  3 Sheets-Sheet 1
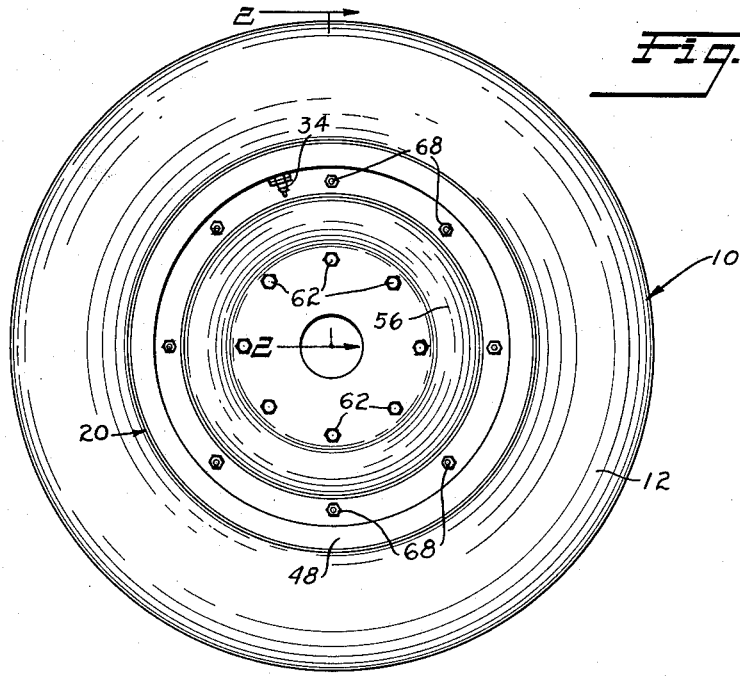
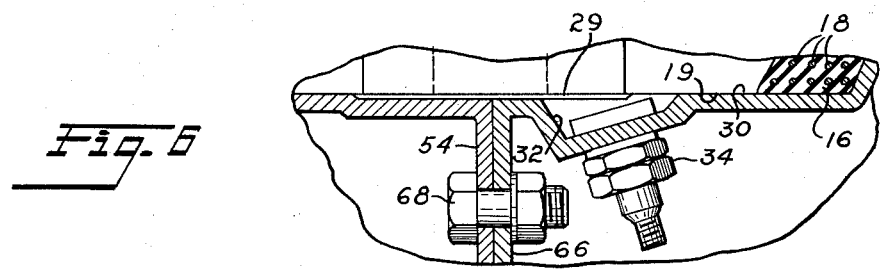
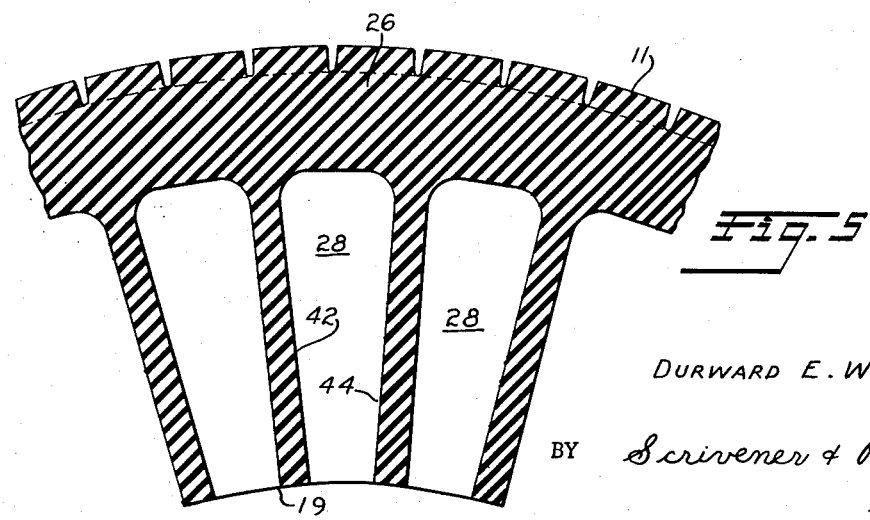
INVENTOR
DURWARD E. WILLIS
BY Scrivener & Parker
ATTORNEYS

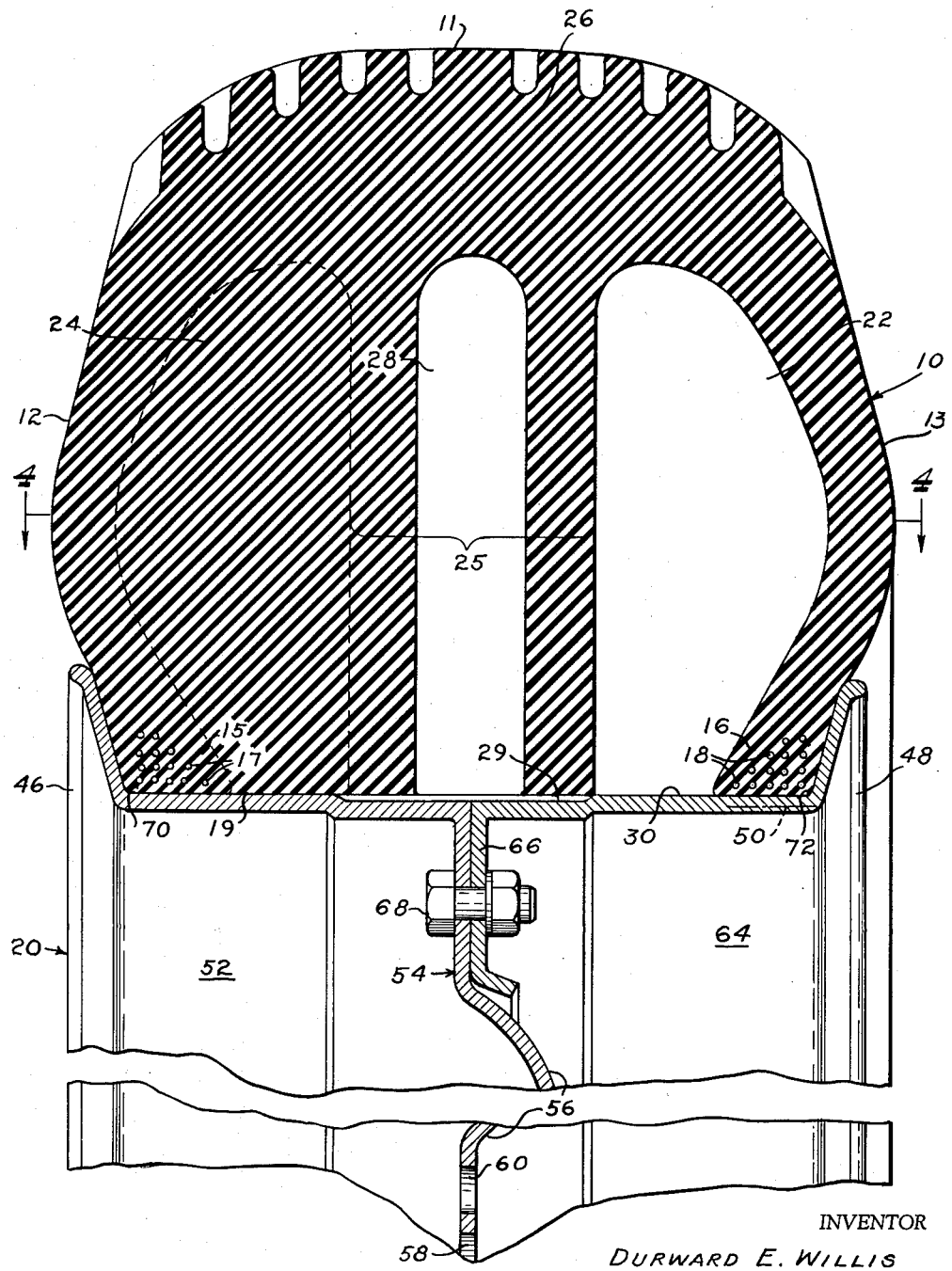

July 16, 1963 D. E. WILLIS 3,097,680
VEHICLE TIRE AND MOUNTING MEANS THEREFOR
Filed Aug. 16, 1961 3 Sheets-Sheet 3
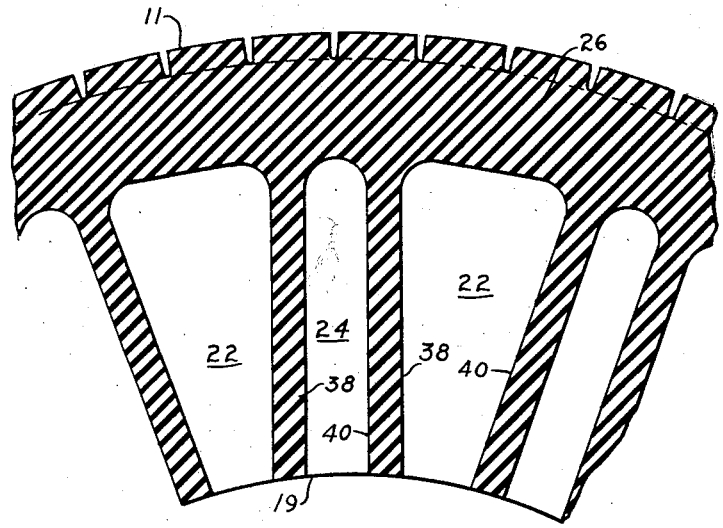
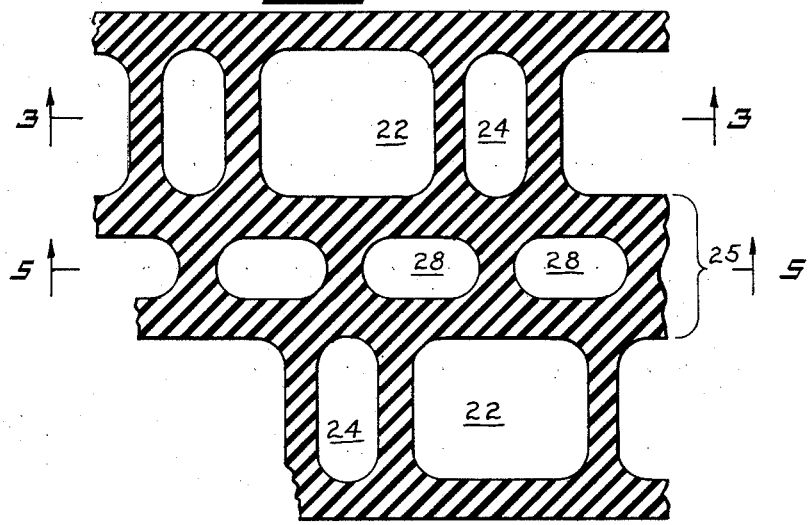
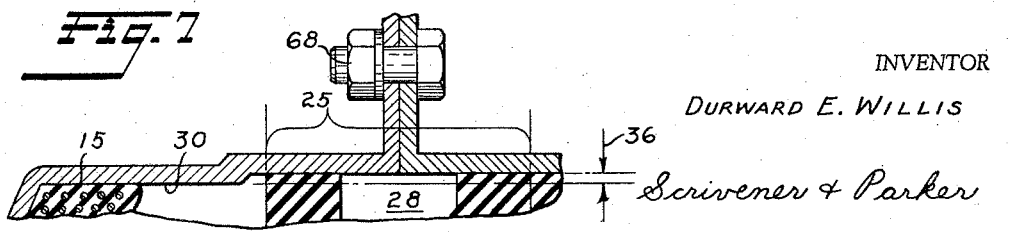
INVENTOR
DURWARD E. WILLIS
Scrivener & Parker
ATTORNEYS United States Patent Office 3,097,680
Patented July 16, 1963

3,097,680
VEHICLE TIRE AND MOUNTING MEANS THEREFOR
Durward E. Willis, Charlotte, N.C., assignor to Willis Acceptance Corp., Charlotte, N.C., a corporation of New Jersey
Filed Aug. 16, 1961, Ser. No. 131,776
8 Claims. (Cl. 152—331)

This invention relates to tires for vehicles and more particularly to an improved tire of the combined pneumatic-solid rubber variety the invention including improved wheel mounting means for said tires.

Present day tires used on automotive vehicles and also on aircraft have, almost without exception, been composed of hollow casings of the tube or tubeless type which must be filled with air at a relatively high pressure in order to maintain the tires in a vehicle supporting condition. Over the course of many years there has been substantially no change in the basic tire and all have been susceptible to the dangers occasioned by punctures or blowouts. The tire industry has endeavored, in certain specific instances, to lessen these dangers, particularly those occasioned by blowouts, by the provision of double-walled tubes and the like. These so-called safety tires have not in any way eliminated the puncture or blowout problems but are merely designed to enable a vehicle to travel a limited distance after the tire has been damaged to a garage where the tire may be replaced or repaired.

It is the principal object of the present invention to eliminate the dangers and problems of the present day conventional tire by the provision of an improved tire which is a radical departure from the tires presently in use.

More particularly, it is the object of the present invention to provide an entirely new and improved tire which is capable of being pneumatically pressurized with the tire being so constructed and arranged that it is not entirely dependent upon the pneumatic pressure for retaining the tire in a vehicle supporting condition and even if the pressure in the tire should be reduced to atmospheric pressure, as by a puncture, the tire nevertheless will continue to support the vehicle with very nearly the same effectiveness as obtains when the tire contains its normal supply of pneumatic pressure.

It is yet another object of the invention to accomplish the foregoing objects by the provision of a unitary tire body of molded rubber or the like which contains a plurality of separate but interconnected cells capable of receiving pneumatic pressure of a relatively low value, which pressure acts in concert with the rubber of the cell walls to provide comfortable support for a vehicle which is equal or superior to that afforded by a conventional tire of the pneumatic variety.

Still another object of the invention is to provide an improved tire of the foregoing nature wherein the cells are so constructed and arranged that, while all of the cells are interconnected so as to permit equalization of pneumatic pressure therein, the cells are nevertheless adapted to be sealed off from each other sequentially by the weight of the vehicle as the tires rotate thus affording at least a partial pneumatic support for the vehicle regardless of whether the tires contain their normal inflating pressure or merely atmospheric pressure.

Still another object of the invention is to provide a tire of the foregoing nature which eliminates the necessity for cords as used in conventional tires so that the tire is capable of manufacture at a cost substantially less than the cost of manufacturing conventional tires.

Still another object of the invention is to provide an improved tire which, while being inexpensive to manufacture, is capable of being frequently regrooved and of having a road life substantially in excess of that of any conventional tire known to the art.

Yet another object of the invention is to provide a tire as set forth in the foregoing objects having associated therewith improved mounting means which eliminates the difficulties and additional equipment necessitated by the mounting means of conventional tires.

Other objects and their attendant advantages will become apparent as the following detailed description is read in conjunction with the accompanying drawings wherein:

FIG. 1 is an elevational view of the tire of the present invention as it appears in mounted condition;

FIG. 2 is an enlarged transverse cross-sectional view taken substantially on the line 2—2 of FIG. 1;

FIG. 3 is a reduced, broken vertical cross-sectional view taken substantially on the line 3—3 of FIG. 4;

FIG. 4 is a reduced horizontal cross-sectional view taken substantially on the line 4—4 of FIG. 2;

FIG. 5 is a broken cross-sectional view taken substantially on the line 5—5 of FIG. 4;

FIG. 6 is an enlarged, broken cross-sectional view showing the pneumatic filling means for the tire of the present invention; and FIG. 7 is an enlarged cross-sectional view showing the manner in which the cells are sealed by the weight of the vehicle.

The tire of the present invention, as can be seen in FIG. 1, is substantially identical in its outward appearance to conventional tires presently in use. However, internally the tire structure is markedly different from conventional tires, the principal distinction residing in the fact that in lieu of being comprised of the hollow, continuous pressurized annular casing of conventional tires, the tire of the invention comprises a unitary substantially solid molding of rubber or the like containing throughout a plurality of radially arranged, interconnected aircells whose structure and function will become apparent hereinafter.

With particular reference to FIG. 2, the tire of the invention is shown as comprising a unitary body 10 of molded rubber or the like having the usual peripheral tread part 11 and exterior side walls 12, 13 whose inner edges are defined by enlarged bead parts 15, 16 which have molded therein continuously coiled wire loops 17, 18. Viewed from one aspect, the tire of the invention may be considered as composed of solid rubber having an inner annular surface 19 which is adapted to receive the vehicle wheel, generally indicated by the numeral 20 in FIG. 2 and through which are the lower open ends of a plurality of cells extending radially into the tire body and separated from each other interiorly by relatively thick portions of the tire body which form the side walls of the respective cells. As best illustrated in FIG. 4 the cells are desirably arranged in three, transversely spaced annular rows with the cells in the two outer rows being arranged in an alternating series of large and small cells 22, 24 with a small cell 24 of one row being transversely opposite a large cell 22 of the opposite row as can be clearly seen in FIG. 4. The outer rows of cells can, in one sense, be considered as being separated from each other by a solid, central annular wall of rubber, indicated by the bracket 25 in FIGS. 2 and 4, which extends radially inwardly from the relatively quite thick peripheral portion 26 of the tire, and centrally disposed within this so-called central wall 25 are a plurality of radially extending cells 28 which are desirably arranged so as to be in transverse overlapping or staggered relationship with the cells of the outer rows as clearly shown in FIG. 4.

As illustrated in FIG. 2 all of the cells are in communication wtih each other through their open inner ends with this communication being afforded by an annular recess 29 centrally disposed on the outer surface 30 of the wheel 20 and having a transverse width greater than the wall part 25 so that the lower open ends of all of the cells are communicated with each other by way of recess. The cells are adapted to be pressurized to a level above atmospheric pressure and to this end the outer, tire-receiving surface 30 of the wheel has formed therein as shown in FIG. 6 a suitable recess 32 which is adapted to receive a conventional tire filler valve assembly 34 whose inner end extends into the recess 32 which in turn is in communication with the annular recess 29, it being apparent that when a conventional air hose is applied to the filler valve, air pressure is delivered by way of the valve 34 and recess 32 to the annular recess 29 from whence the pressurized air flows through the open ends of the cells so that all are pressurized to the same degree.

One of the important features of the invention, and with particular reference to FIG. 7, is the ability of each of the cells to be momentarily sealed out of communication with the other cells as a result of the vehicle's weight acting downwardly on the tire. As intended to be illustrated in FIG. 7, when the weight of the vehicle acts downwardly on the wheel that part of the central wall 25 which lies in a transverse plane perpendicular to the road surface is caused by the weight of the vehicle to be depressed into tight sealing engagement with the bottom of the annular recess 29, the wall part 25 in so doing moves through a distance represented by the spaced apart arrows 36 shown in FIG. 7. To insure that the large cells 22 are sealed at their inner ends on both sides of the center of effort exerted downwardly by the vehicle weight, it is desirable that the open inner ends of the larger cells be sufficiently small in cross-sectional area to insure proper sealing. With particular reference to FIG. 3 it will be seen that this desired result is achieved by molding the large cells 22 in the tire body with their circumferential radial side edges 38, 40, covering toward the open end of each cell so that the open ends of all of the cells have substantially the same circumferential extent, this dimension being sufficiently small relative to the circumference of the wheel surface 30 to effect sealing and consequent trapping of air in the cells to provide at least partial pneumatic support of the vehicle as each cell is moved directly under the axle as the vehicle moves along the roadway. In like manner and for the same purpose the central row of cells 28 in the wall 25 may have their circumferential side walls 42, 44 converge as illustrated in FIG. 5.

It will be apparent to those skilled in the art that with the tire of the invention being composed of a unitary molded mass of rubber, the outer walls 12, 13 do not have the transverse flexibility found in conventional tires and hence the pressure in the tires is not intended to be relied upon to expand the beads of the tire into tight sealing engagement with the rims 46, 48 of the wheel 20. In accordance with the invention, this necessary bead sealing is achieved by molding the tire so that the inner diameter of the beads is slightly less than the external diameter of the tire mounting surface 30 of the wheel 20, the pre-mounting diameter of the tire being indicated by the dotted line 50 on the right hand side of FIG. 2.

Though the tire of the invention may be used with any of a variety of suitable wheels, in accordance with the invention, the tire is preferably mounted on an improved wheel which is constructed in two parts as shown in FIG. 2, the left hand part 52 having a continuous central web 54 which may have stamped therein for strength an annular channel 56 which is arcuate in cross-section. Centrally in the web is the usual aperture 58 adapted to receive the outer end of the axle as in a conventional wheel and surrounding the aperture are a plurality of mounting holes 60 which are adapted to receive conventional screw lugs 62 for attaching the wheel to the hub. The second part of the wheel is indicated by the numeral 64 and this is provided with a central integral inwardly extending flange 66 which is adapted to be bolted to the web 54 of the wheel part 52 by means of suitable bolts 68 which extend through registering apertures in the web and in the flange 66 as shown in FIG. 2.

When the tire is to be mounted on to the wheel, the wheel is first removed from the hub by removing the lugs 66 and thereafter the bolts 68 are removed so as to separate the two parts of the wheel. The side 14 of the tire is then forced on to the part 52 of the wheel and the latter is moved inwardly with respect to the tire as far as practicable, it being contemplated that because of the slightly smaller internal diameter of the tire bead this may not under normal circumstances be capable of being moved into engagement with the flange 46 at this stage of the mounting process. After the part 52 has been moved with respect to the tire as far as practicable, the second part 64 of the wheel is then inserted into the center opening of the tire from the opposite side thereof and after it has been moved inwardly as far as practicable, the bolts 68 are inserted through the aligned apertures in the wheel parts and the nuts on the bolts 68 are thereafter progressively tightend until the flange 66 is moved into abutment with the web 54. As the flange 66 is moved toward the web the rims 46, 48 of the wheel part squeeze inwardly on the tire sides 15, 16 and when the flange 66 is in tight engagement with the web 54 the corners 70, 72 of the beads are compressed tightly and sealingly into the corresponding corners of the wheel formed between the rims 46, 48 and the transverse tire mounting surface 30. When the tire is to be removed from the wheel the reverse of the above described procedure is followed, it being understood that in mounting or dismounting the tire no complicated expensive power equipment is required as is necessary in the mounting and dismounting of conventional tires.

In use, with the tires mounted on a vehicle and supplied with pneumatic pressure on the order of 15 p.s.i., as the vehicle moves along the road, the vehicle at any particular instance is supported by a combination of rubber and air pressure trapped in at least one cell by engagement of the central rubber wall 25 with the wheel surface 30 as a result of the vehicle's weight and it is to insure that at least one cell is positively sealed that the cells are arranged transversely in staggered relationship so that before one cell moves out of sealing relationship with the wheel another has just moved into sealing relationship therewith thus insuring uniform vehicle support and cushioned smooth riding. Desirably the volume of each of the cells is made relatively quite small so that any tendency of the tire to compress beyond a desirable amount will cause the pressure in any sealed-off cell to rise rapidly and considerably in excess of the normall pressure of 15 p.s.i. and thus resist the tendency of the tire to compress beyond the desired limit.

Should, in the course of driving, one of the tires become punctured so that the pressure therein is relieved, this will result in a degree of flattening of the tire though this will be of such slight amount as to have substantially no effect on the driving ability of the vehicle. As before, as the wheel rotates, air at atmospheric pressure will be trapped in the cells and any tendency of the tire to collapse beyond a predetermined amount will cause the pressure of the trapped air to rapidly rise momentarily to a level which will effectively resist any collapsing tendency of the tire. Thus a driver, if he wishes, after loss of normal pneumatic pressure may continue to his destination if time will not permit him to stop at the next repair station.

Because of the relatively low pneumatic pressures employed and also because of the relatively small, isolated volumes in the tire as well as the relatively quite thick walls of solid rubber throughout the tire body, the tire of the invention is not susceptible to blowouts and this particular danger which is common to all tires presently in use is entirely eliminated by the invention. Additionally, because of the relatively quite thick peripheral portion 26 of the tire it is capable of having the tread frequently renewed as it is worn down, after several regroovings to maintain non-skid characteristics.

Because a tire of the present invention does not employ cords as is required in the use of conventional tires, a number of expensive manufacturing steps are eliminated and only a single molding operation is required in the manufacture of the tire of the invention. Because the tire is of a unitary construction there are no weakening vulcanized joints which in conventional tires may be a source of danger, particularly when the tire becomes exceptionally heated after an extended period of driving in hot weather. The suitability of the tire of the invention for use on aircraft should be apparent in view of the number of accidents which are caused by the simultaneous failure of all the landing wheel tires resulting from a faulty landing approach or a jamming of the brakes in applied condition because of malfunctioning of the hydraulic system. Because the tire of the invention will continue to support an aircraft regardless of the pressure sustained in the tire, the ground loops and other dangerous landing accidents caused by blown tires should be substantially eliminated by the use of the tire of the present invention.

In addition to use on ordinary vehicles and on aircraft, the tire of the invention is particularly suitable for use on military vehicles which may be subjected to combat conditions. When a presently used conventional tire on military vehicle is pierced by enemy gunfire, the vehicle is immediately immobilized and is of no further use in a particular military operation even though the vehicle may otherwise be entirely undamaged. When equipped with the tire of the present invention it will be apparent that the vehicle may continue in action even though the tire may be punctured several times by gunfire.

It will also be apparent to those skilled in the art, that the wheel mounting means described herein, while not necessarily limited to use with the tire of the invention, or vice versa, enables an individual to apply the tire to the wheel with substantially no tools other than a wrench. Modern day conventional tires are extremely difficult if not impossible to mount without specialized and expensive equipment not normally available to the ordinary vehicle owner. With the mounting means afforded by the present invention, the necessity for specialized equipment and experience is eliminated.

It will be understood by those skilled in the art that the number, sizes and arrangements of the cells may vary within reasonable limits. It will also be apparent that the tire and mounting means therefor of the invention are susceptible of a variety of changes or modifications without, however, departing from the scope or spirit of the appended claims. Where the word "rubber" is used herein this is intended to include any equivalent resilient material as, for example, synthetic rubber or elastomers, which may be employed in the manufacture of tires.

What is claimed is:

1. A vehicle tire comprising a unitary substantially solid molded annular body of resilient material having laterally spaced beads adapted to sealingly abut the rims of a vehicle wheel when said tire is mounted thereon, said body having a relatively thick tread portion and a central annular wall integral with said portion and dividing the interior of said body into two annular parts, said wall extending radially inwardly from said tread portion and having an inner annular edge which is normally radially spaced out of engagement with the adjacent surface of a wheel when said tire is mounted thereon, a plurality of circumferentially spaced cells in each of said two annular parts on opposite sides of said wall, each of said cells having an opening of limited circumferential extent extending through the inner surface of each of said parts between the inner edge of said wall and the respective bead of said part, each of said openings being connected with the radial space defined by the inner edge of said wall, a limited circumferential portion of the inner edge of said wall being adapted to be moved into tight sealing relationship with the corresponding adjacent surface of a wheel by the weight of a vehicle acting downwardly thereon so as to close off a cell opening which is connected with that part of the inner edge which is in sealing engagement with the adjacent surface of a wheel.

2. The vehicle tire of claim 1 wherein said wall part has molded therein a plurality of cells each having an opening of limited circumferential extent extending through the annular edge of said wall.

3. A vehicle tire in accordance with claim 1 wherein the cells of one of said annular parts are staggered laterally with respect to the cells of the other of said annular parts.

4. In combination with a vehicle wheel having a cylindrical tire receiving part and opposed rims on the opposite sides of said part, a tire comprising a unitary substantially solid molded annular body of resilient material having a relatively thick tread part, an inner annular central part normally radially spaced from the cylindrical part of said wheel, and opposed beads sealingly engaging the rims of said wheel, a plurality of air cells molded into said body and having openings of limited circumferential extent extending through the inner annular part of said tire, means affording an annular airspace between the cylindrical part of said wheel and the inner annular part of said tire whereby all of said openings of said cells are interconnected with each other, said inner annular part being responsive to the compression of said tire caused by the downwardly acting weight of a vehicle acting thereon so that a circumferential portion of the inner part in line with the downwardly acting weight is moved into tight engagement with the adjacent surface of the cylindrical part of said wheel to seal off any cell opening embraced by the circumferential portion of the inner central part of said tire in tight engagement with said wheel.

5. The tire of claim 4 including means for supplying pneumatic pressure to the annular airspace between said cylindrical tire receiving part of said wheel and the inner annular part of said tire.

6. The tire of claim 4 wherein the diameter of said beads is slightly less than the diameter of the cylindrical part of said wheel.

7. The tire of claim 4 wherein said beads have molded therein a plurality of loops of continuously coiled wire.

8. A tire and wheel combination, said tire having a pair of laterally spaced integral beads, said wheel comprising a first part having a rim, a cylindrical part connected to said rim and having a lateral width substantially equal to one-half the corresponding width of said tire, said cylindrical part being received within the center opening of said tire with the bead of the latter in tight sealing relationship with said rim, a web integrally connected to the inner end of said cylindrical part and extending radially inwardly and including means for attaching said web to the hub of a vehicle axle, a second part of said wheel having a rim, a second cylindrical part connected to said rim and having a width substantially equal to the width of said first cylindrical part, said second cylindrical part being received within the center opening of said tire on the side thereof opposite the first part with the rim of the second part in tight sealing relationship with said second bead of said tire, an annular flange integrally connected with the inner end of second cylindrical part and extending radially inwardly, detachable fastening means rigidly connecting said flange in abuting relationship with the web of said first part of said wheel, said tire having an inner cylindrical surface part adjacent the cylindrical parts of said wheel parts, an annular recess formed on the adjacent inner ends of each of said cylindrical parts so as to afford an annular air space between the center of the cylindrical inner surface part of said tire and the bottom of said recesses in the cylindrical parts of said wheel parts, and a plurality of radially arranged air cells molded into the body of said tire each of said cells having an opening leading into said annular space.

References Cited in the file of this patent

UNITED STATES PATENTS

| | | |
|---|---|---|
| 2,165,810 | Paselk | July 11, 1939 |
| 2,246,117 | Wallace | June 17, 1941 |
| 2,701,971 | Carter et al. | Feb. 15, 1955 |

FOREIGN PATENTS

| | | |
|---|---|---|
| 151,777 | Germany | June 2, 1904 |